US011417905B2

(12) United States Patent
Naito et al.

(10) Patent No.: US 11,417,905 B2
(45) Date of Patent: *Aug. 16, 2022

(54) FUEL CELL SYSTEM

(71) Applicant: HONDA MOTOR CO., LTD., Tokyo (JP)

(72) Inventors: Hideharu Naito, Wako (JP); Masahiro Sato, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 175 days.

This patent is subject to a terminal disclaimer.

(21) Appl. No.: 16/891,117

(22) Filed: Jun. 3, 2020

(65) Prior Publication Data
US 2020/0388873 A1 Dec. 10, 2020

(30) Foreign Application Priority Data

Jun. 7, 2019 (JP) .............................. JP2019-106703

(51) Int. Cl.
*H01M 8/2475* (2016.01)
*H01M 8/04089* (2016.01)

(52) U.S. Cl.
CPC ..... *H01M 8/2475* (2013.01); *H01M 8/04089* (2013.01); *H01M 2250/20* (2013.01)

(58) Field of Classification Search
CPC .......... H01M 8/2475; H01M 8/04089; H01M 2250/28
USPC ....................................................... 123/531
See application file for complete search history.

(56) References Cited

U.S. PATENT DOCUMENTS

| | | | |
|---|---|---|---|
| 2016/0133953 A1* | 5/2016 | Takeyama | H01M 8/04067 429/435 |
| 2016/0190632 A1 | 6/2016 | Itoga | |
| 2017/0057339 A1* | 3/2017 | Nakagawa | H01M 8/24 |
| 2017/0244128 A1* | 8/2017 | Naito | H01M 8/2475 |
| 2020/0303760 A1* | 9/2020 | Naito | B60L 50/72 |

FOREIGN PATENT DOCUMENTS

| | | | | |
|---|---|---|---|---|
| JP | 2008-041334 | | 2/2008 | |
| JP | 2013-004352 | | 1/2013 | |
| JP | 2013206855 A | * | 10/2013 | .............. H01M 8/24 |
| JP | 2016-122502 | | 7/2016 | |

OTHER PUBLICATIONS

Japanese Office Action for Japanese Patent Application No. 2019-106703 dated Mar. 30, 2021.

* cited by examiner

*Primary Examiner* — Mahmoud Gimie
(74) *Attorney, Agent, or Firm* — Amin, Turocy & Watson, LLP

(57) ABSTRACT

A fuel cell system includes a stack case and an auxiliary device case. The stack case stores a stack body formed by stacking a plurality of power generation cells in a horizontal direction. The auxiliary device case stores a fuel cell auxiliary devices. The inside of the of the stack case and the inside of the auxiliary device case that are adjacent to each other in the horizontal direction are partitioned by a partition wall. An auxiliary device side passage which connects the inside of the auxiliary device case and an auxiliary device side exhaust gas duct together is provided in an upper part of the auxiliary device case. A plurality of ribs protruding toward the inside of the auxiliary device case and extending in a vertical direction are provided in the partition wall.

3 Claims, 6 Drawing Sheets

(1)

FUEL CELL SYSTEM

CROSS-REFERENCE TO RELATED APPLICATION

This application is based upon and claims the benefit of priority from Japanese Patent Application No. 2019-106703 filed on Jun. 7, 2019, the contents of which are incorporated herein by reference.

BACKGROUND OF THE INVENTION

Field of the Invention

The present invention relates to a stack case which stores a stack body formed by stacking a plurality of power generation cells together, and an auxiliary device case which stores a fuel cell auxiliary device.

Description of the Related Art

For example, a solid polymer electrolyte fuel cell includes a membrane electrode assembly (MEA) formed by providing an anode on one surface of an electrolyte membrane, and a cathode on the other surface of the electrolyte membrane. The electrolyte membrane is a polymer ion exchange membrane. A power generation cell is formed by sandwiching the membrane electrode assembly between separators. Normally, a predetermined number of power generation cells are stacked together to form a stack body.

In use, for example, the fuel cell system including the stack body of this type is mounted in a mounting space such as a fuel cell vehicle. In this case, in particular, even if leakage of a fuel gas which is a hydrogen gas from the stack body, etc. occurs, it is required to suppress stagnation of the leaked fuel gas, e.g., in the mounting space in the vehicle. To this end, an exhaust gas duct is connected to the inside of the stack case which stores the stack body, and the leaked fuel gas in the stack case is discharged to a predetermined location, e.g., to the outside of the vehicle through the exhaust gas duct. By ventilating the inside of the stack case in this manner, it is possible to suppress stagnation of the leaked fuel gas in the mounting space, etc.

For example, as shown in Japanese Laid-Open Patent Publication No. 2013-004352, in the fuel cell system, an auxiliary device case which stores fuel cell auxiliary devices including an injector, etc. of a fuel gas may be provided adjacent to a stack case.

SUMMARY OF THE INVENTION

In the fuel cell system including the auxiliary device case which stores the fuel cell auxiliary devices as described above, it is necessary to ventilate the inside of the auxiliary device case suitably.

The present invention has been made taking such a problem, and an object of the present invention is to provide a fuel cell system which can ventilate the inside of an auxiliary device case suitably.

In order to achieve the above object, the present invention provides a fuel cell system including a stack case configured to store a stack body including a plurality of power generation cells stacked together in a horizontal direction, and an auxiliary device case configured to store a fuel cell auxiliary device, wherein inside of the stack case and inside of the auxiliary device case that are adjacent to each other in the horizontal direction are partitioned by a partition wall, an auxiliary device side passage configured to connect the inside of the auxiliary device case to an auxiliary device side exhaust gas duct is provided in an upper part of the auxiliary device case, and a plurality of ribs protruding toward the inside of the auxiliary device case and extending in a vertical direction are provided in the partition wall.

In the fuel cell system, if leakage of the fuel gas occurs in the auxiliary device case, the leaked fuel gas flows through the grooves formed between the ribs that are adjacent to each other in a manner that the leaked fuel gas is guided in the direction in which the ribs extend (vertical direction) toward the auxiliary device side passage in the upper part of the auxiliary device case. Accordingly, the leaked fuel gas in the auxiliary device case is discharged into the auxiliary device side exhaust gas duct effectively, and it is possible to suitably ventilate the inside of the auxiliary device case.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

Figure 1:
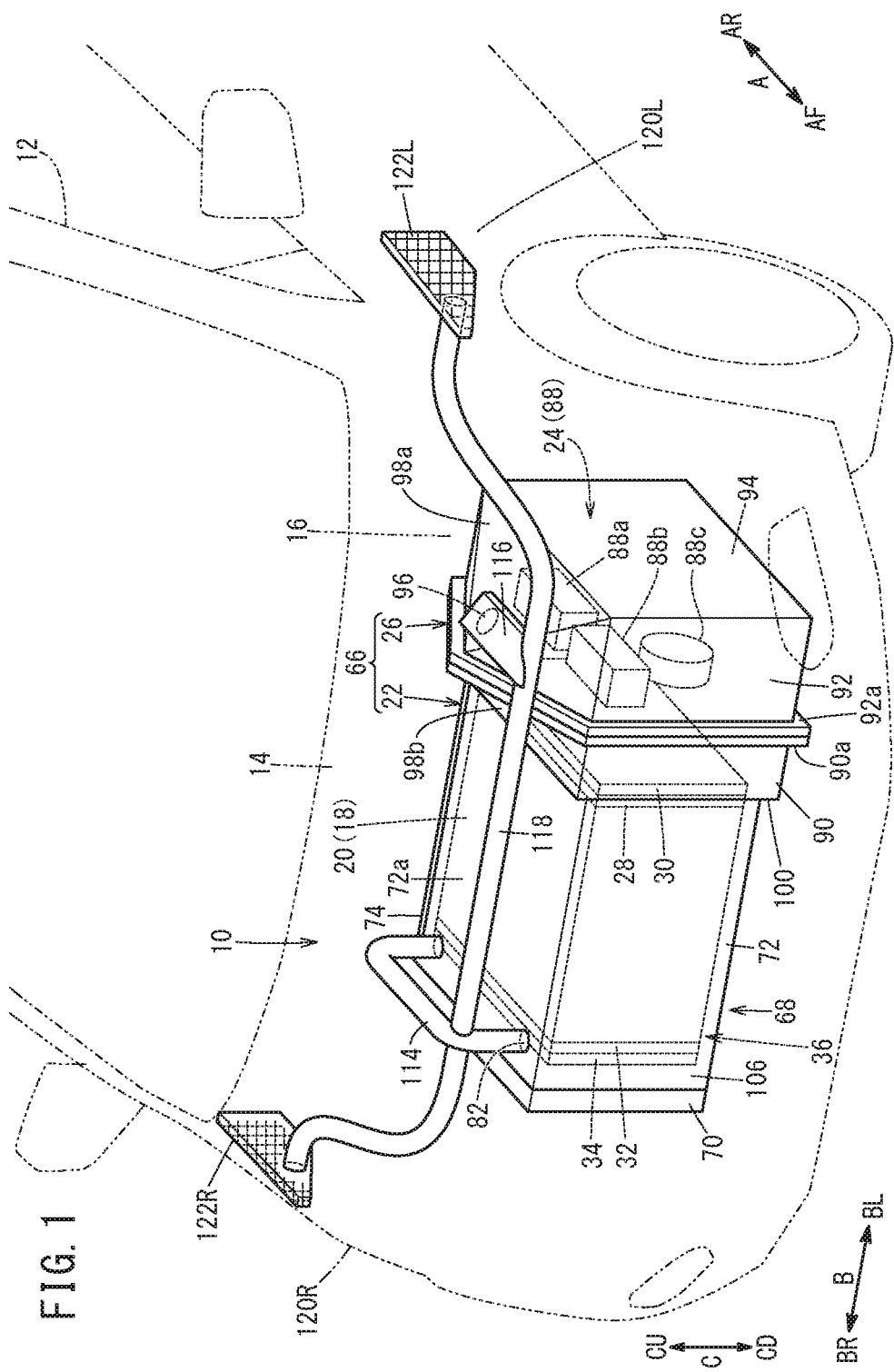
FIG. 1 is a perspective view showing a fuel cell vehicle including a fuel cell system according to an embodiment of the present invention.

A preferred embodiment of a fuel cell system according to the present invention will be described in detail with reference to the accompanying drawings. In the drawings, the constituent elements which have the same or similar functions and which offer the same or similar advantages are labeled with the same reference numerals, and description of such constituent elements may not be repeated.

As shown in FIG. 1, the embodiment of the present invention will be described in connection with a case where a fuel cell system 10 is mounted in a fuel cell vehicle 12 which is a fuel cell automatic vehicle. However, the present invention is not limited in this respect. In use, the fuel cell system 10 may be mounted in various mounting targets (not shown). Hereinafter, unless specially noted, a front/rear direction (indicated by an arrow A), a left/right direction (indicated by an arrow B), and an upper/lower direction (indicated by an arrow C) mentioned in the following description are based on a direction viewed from a passenger (not shown) seated on the driver's seat of the fuel cell vehicle 12.

As shown in FIG. 1, the fuel cell system 10 is provided in a front room (motor room) 16 formed on the front side (indicated by an arrow AF) of a dashboard 14 of the fuel cell vehicle 12. Further, the fuel cell system 10 includes a stack body 20 formed by stacking a plurality of power generation cells 18 together (FIG. 2) in a left/right direction (indicated by the arrow B), a stack case 22 storing the stack body 20, and an auxiliary device case 26 storing a fuel cell auxiliary device 24.

Hereinafter, unless specifically noted, it is assumed that the fuel cell system 10 is disposed in the fuel cell vehicle 12 in a manner that the stacking direction of the stack body 20 is oriented in the left/right direction (horizontal direction indicated by the arrow B). However, the present invention is not limited in this respect. For example, the fuel cell system 10 may be mounted in the fuel cell vehicle 12 in a manner that the stacking direction of the stack body 20 is oriented in the front/rear direction (horizontal direction indicated by the arrow A).

As shown in FIG. 1, a first terminal plate 28 is stacked on the left end (indicated by an arrow BL) of the stack body 20 in the stacking direction. A first insulating plate 30 is stacked outside the first terminal plate 28. A second terminal plate 32 is stacked on the right end (indicated by an arrow BR) of the stack body 20. A second insulating plate 34 is stacked outside the second terminal plate 32. Hereinafter, structure where the stack body 20, the first terminal plate 28, the second terminal plate 32, the first insulating plate 30, and the second insulating plate 34 are stacked together is also referred to as a stack 36.

Figure 2:
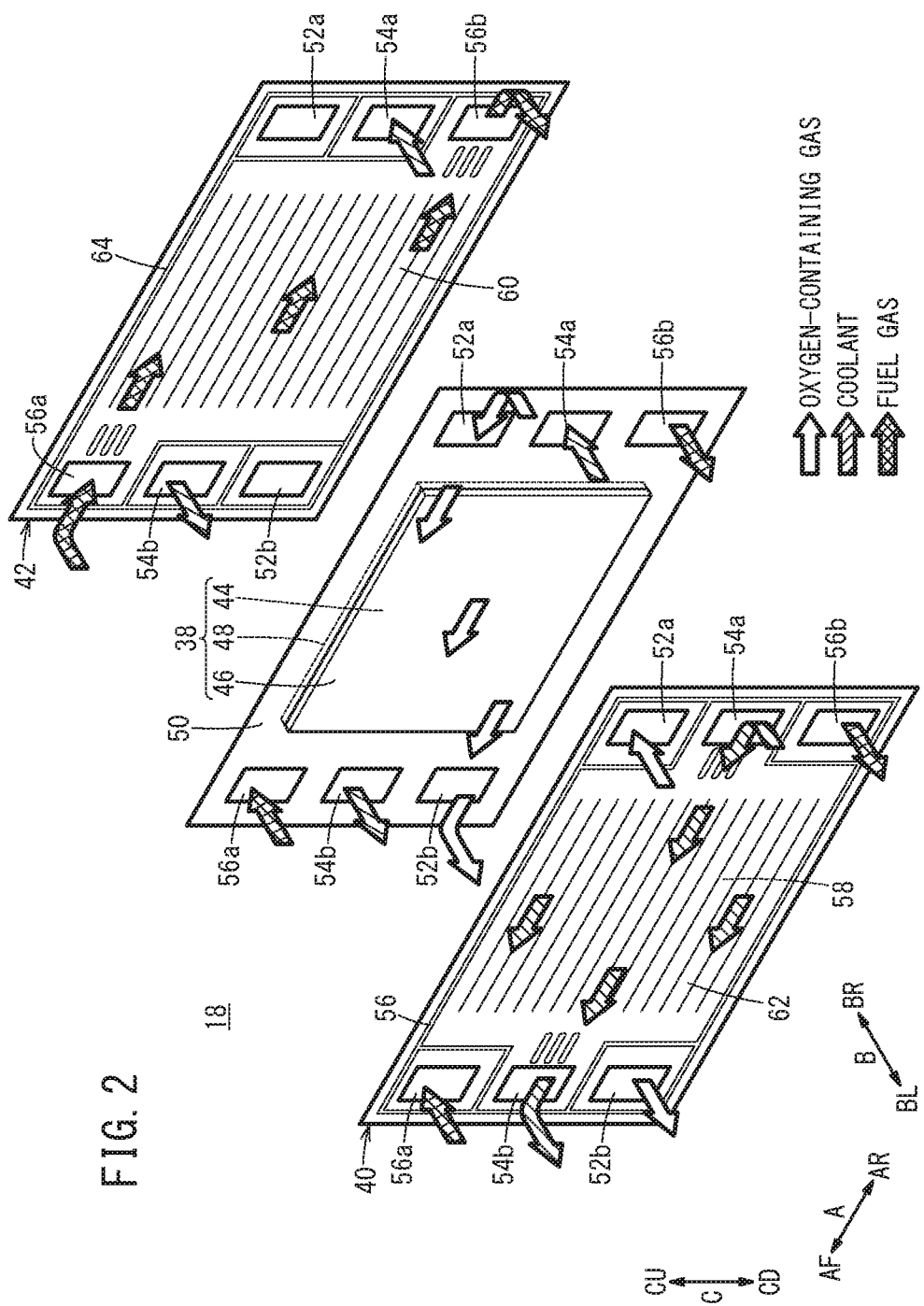
FIG. 2 is an exploded perspective view showing a power generation cell.

As shown in FIG. 2, the power generation cell 18 includes a membrane electrode assembly 38, and a first separator 40 and a second separator 42 sandwiching the membrane electrode assembly 38. The membrane electrode assembly 38 includes an electrolyte membrane 44, and a cathode 46 and an anode 48 holding the electrolyte membrane 44. A resin frame member 50 in the form of a film is provided on an outer peripheral portion of the membrane electrode assembly 38. The first separator 40 and the second separator 42 are metal separators or carbon separators.

At one end of a rectangular power generation cell 18 in a longitudinal direction indicated by an arrow A (an end in a direction indicated by an arrow AR), an oxygen-containing gas supply passage 52a, a coolant supply passage 54a, and a fuel gas discharge passage 56b are arranged in a vertical direction (indicated by an arrow C). The oxygen-containing gas supply passage 52a, the coolant supply passage 54a, and the fuel gas discharge passage 56b extend through the power generation cell 18 in the stacking direction (indicated by the arrow B). For example, an oxygen-containing gas is supplied to the oxygen-containing gas supply passage 52a. A coolant is supplied to the coolant supply passage 54a. A fuel gas such as a hydrogen-containing gas is discharged from the fuel gas discharge passage 56b.

At the other end of the power generation cell 18 (end in the direction indicated by the arrow AF), a fuel gas supply passage 56a for supplying the fuel gas, a coolant discharge passage 54b for discharging the coolant, and an oxygen-containing gas discharge passage 52b for discharging the oxygen-containing gas are arranged in the vertical direction. The fuel gas supply passage 56a, the coolant discharge passage 54b, and the oxygen-containing gas discharge passage 52b extend through the power generation cell 18 in the stacking direction.

The first separator 40 has an oxygen-containing gas flow field 58 on its surface facing the membrane electrode assembly 38. The oxygen-containing gas flow field 58 is connected to the oxygen-containing gas supply passage 52a and the oxygen-containing gas discharge passage 52b. The second separator 42 has a fuel gas flow field 60 on its surface facing the membrane electrode assembly 38. The fuel gas flow field 60 is connected to the fuel gas supply passage 56a and the fuel gas discharge passage 56b.

A coolant flow field 62 is provided between the first separator 40 and the second separator 42 of the power generation cells 18 that are adjacent to each other. The coolant flow field 62 is connected to the coolant supply passage 54a and the coolant discharge passage 54b. Elastic seal members 64 are provided integrally with the first separator 40 and the second separator 42, respectively. Alternatively, members separate from the first separator 40 and the second separator 42 are provided as the elastic seal member 64 on the first separator 40 and the second separator 42, respectively. The seal members 64 contact the resin frame members 50, respectively. Examples of materials of the seal member 64 include silicone rubber and nitrile rubber. Instead of the seal member 64, an elastic bead seal (not shown) protruding toward the resin frame member 50, may be provided integrally with each of the first separator 40 and the second separator 42 by press forming.

As shown in FIG. 1, the stack case 22 and the auxiliary device case 26 are provided adjacent to each other in a left/right direction (indicated by an arrow B) to form a case unit 66. The case unit 66 has a rectangular shape in a plan view. The long side of the case unit 66 extends in the vehicle width direction (stacking direction of the stack body 20, in the direction indicated by the arrow B).

Figure 3:
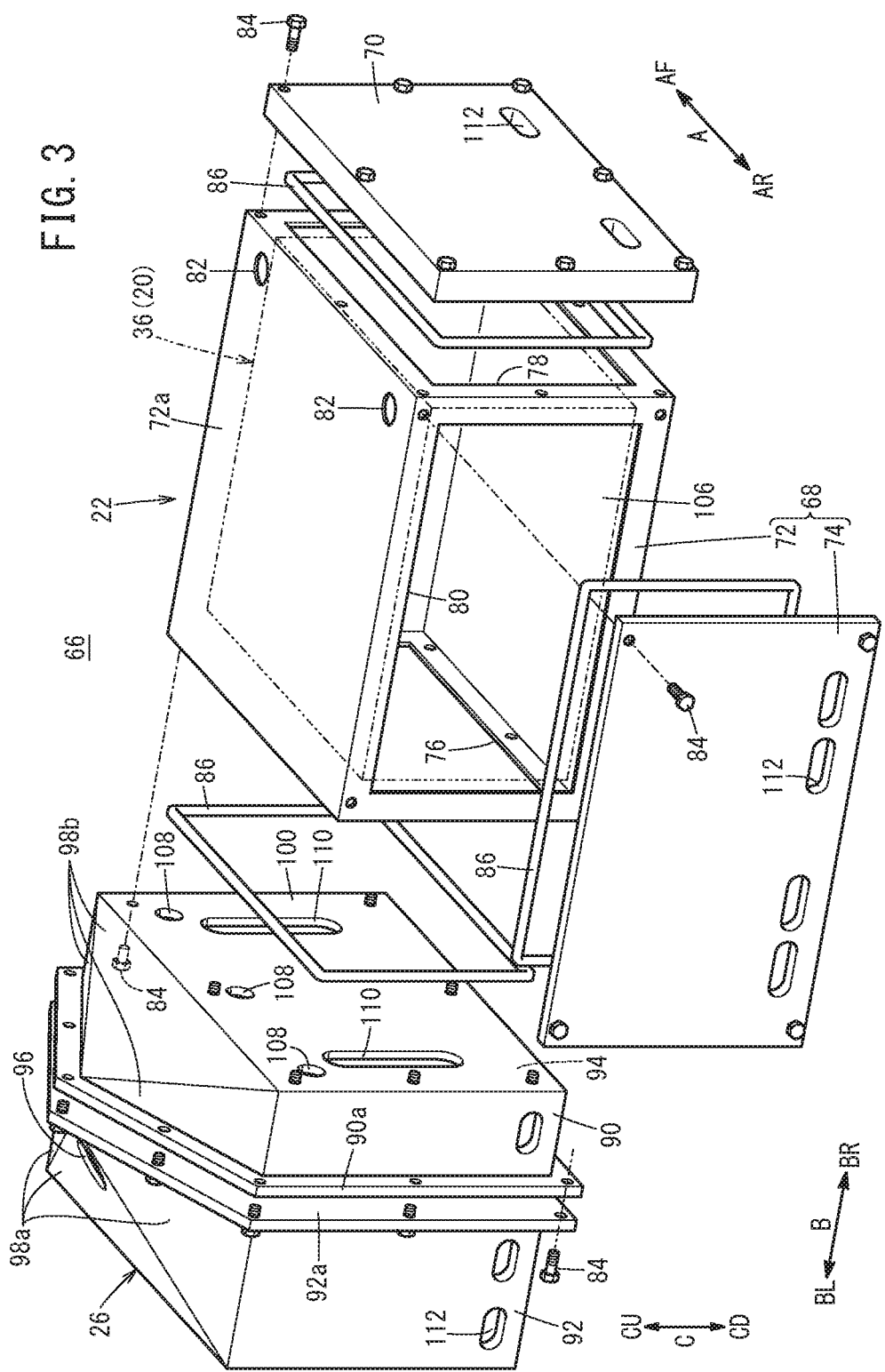
FIG. 3 is an exploded perspective view showing a case unit.

As shown in FIG. 3, the stack case 22 is formed to include a peripheral wall case 68 covering the outer peripheral surface of the stack 36 (stack body 20), and an end plate 70 provided at a right end of the stack 36 in the stacking direction (end indicated by an arrow BR). The peripheral wall case 68 includes a case body 72 having a rectangular shape in a plan view, and a rear panel 74.

The case body 72 includes a rectangular left opening 76 formed on the left side (indicated by an arrow BL), a rectangular right opening 78 formed on the right side (indicated by an arrow BR), and a rectangular rear opening 80 formed on the rear side (indicated by an arrow AR). The case body 72 has a box shape. Further, stack side passages 82 penetrate through an upper wall 72a of the case body 72, at both ends in the front/rear direction (indicated by the arrow A) on the right end side of the upper wall 72a (indicated by the arrow BR). That is, the stack side passages 82 are provided at right corners of the upper wall 72a of the case body 72, respectively.

The rear panel 74 is fixed to the case body 72 using bolts 84 in a manner to close the rear opening 80. A seal member 86 made of elastic material is interposed between the case body 72 and the rear panel 74, along the outer periphery of the rear opening 80. It should be noted that the rear panel 74 and the case body 72 may not be separate component parts. The rear panel 74 may be integral with the case body 72.

The end plate 70 is joined to the case body 72 using the bolts 84 in a manner to close the right opening 78. In the structure, the end plate 70 contacts the right end (end indicated by the arrow BR) of the stack 36 provided in the case body 72. The seal member 86 made of elastic material is interposed between the case body 72 and the end plate 70, along the outer periphery of the right opening 78. The end plate 70 has a rectangular shape, and the longitudinal direction of the end plate 70 is oriented in the front/rear direction (direction indicated by the arrow A).

As shown in FIG. 1, the auxiliary device case 26 is a protection case for protecting the fuel cell auxiliary device 24. A hydrogen system auxiliary device 88 is stored in the auxiliary device case 26, as the fuel cell auxiliary device 24.

The hydrogen system auxiliary device 88 includes an injector 88*a*, an ejector 88*b*, a fuel gas pump 88*c*, and valves (not shown).

Specifically, as shown in FIG. 3, the auxiliary device case 26 includes a first case member 90 and a second case member 92 each having a box shape. One end of each of the first case member 90 and the second case member 92 is opened, and flanges 90*a*, 92*a* are provided around openings of the first case member 90 and the second case member 92. The first case member 90 and the second case member 92 are joined together by fixing the flanges 90*a*, 92*a* of the first case member 90, and the second case member 92 together using bolts. An internal space of the auxiliary device case 26 which stores the fuel cell auxiliary device 24 (see FIG. 1) (hereinafter referred to as an "auxiliary device storage space 94") is formed between the first case member 90 and the second case member 92 that are joined together as described above.

Figure 6:
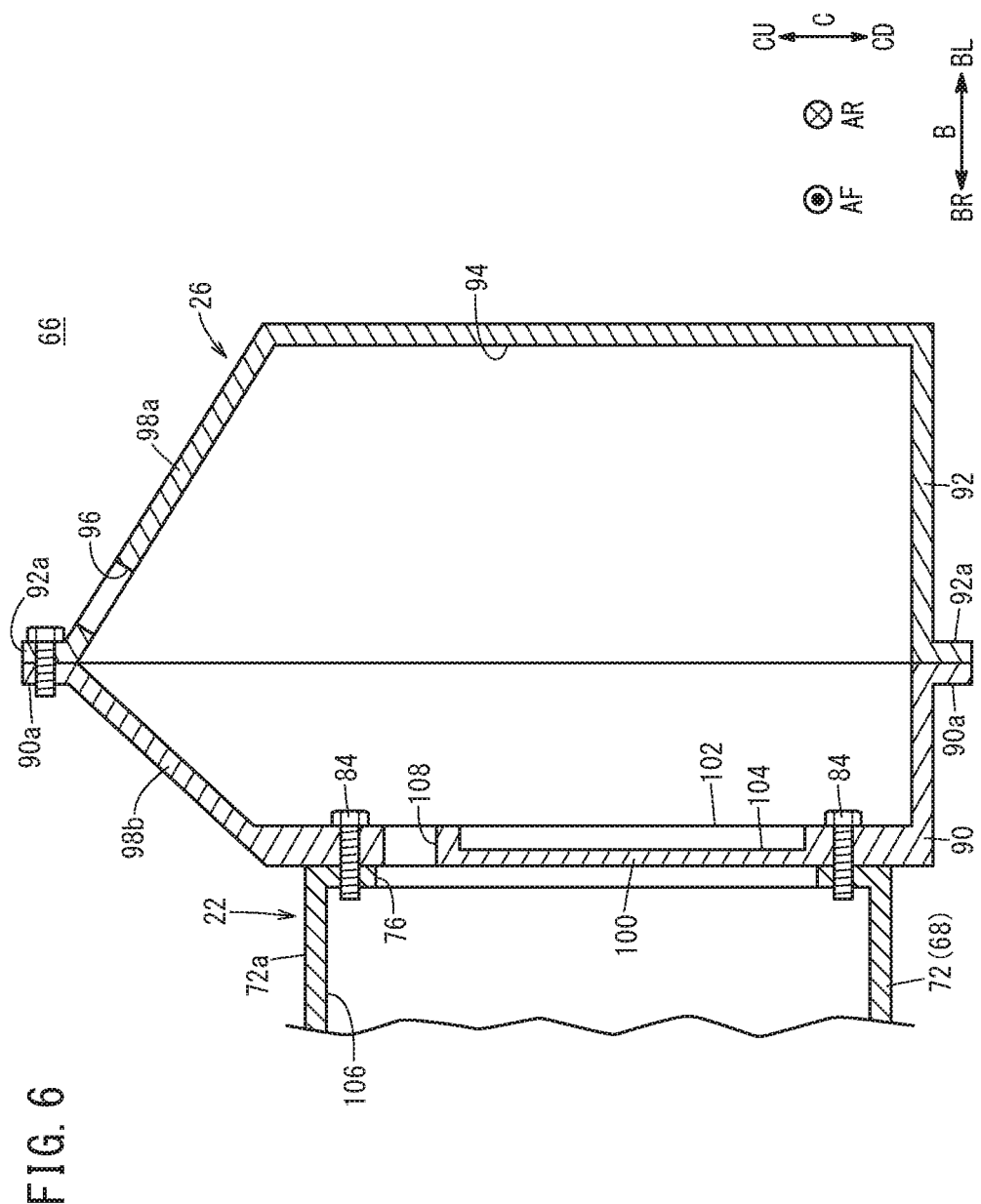
FIG. 6 is a partial cross sectional view showing a case unit.

As shown in FIGS. 3 and 6, an auxiliary device side passage 96 penetrates through an upper portion of the second case member 92. The auxiliary device side passage 96 connects the inside and the outside of the auxiliary device storage space 94. The auxiliary device side passage 96 is provided in the upper part of an inclined portion 98*a* forming the upper surface of the second case member 92.

As shown in FIG. 3, specifically, the upper part of the second case member 92 includes a plurality of (three, in the embodiment of the present invention) inclined portions 98*a* forming an upward protrusion. These inclined portions 98*a* are inclined upward in the vertical direction toward the first case member 90. Further, the auxiliary device side passage 96 is provided at the top part where the plurality of inclined potions 98*a* are gathered. The auxiliary device side passage 96 is opened obliquely upward on the left end side (indicated by the arrow BL), in the second case member 92.

As shown in FIG. 3, an upper part of the first case member 90 includes a plurality of (three in the embodiment of the present invention) inclined portions 98*b* forming the upward protrusion, and the plurality of inclined portions 98*b* are inclined upward in the vertical direction toward the second case member 92. In the structure, the upper part of the auxiliary device case 26 (upper part of the first case member 90 and the upper part of the second case member 92) has a reverse V shape (triangular roof shape) as viewed in the stacking direction of the stack body 20 (direction indicated by the arrow B, the horizontal direction), and also in the vehicle front/rear direction (direction indicated by the arrow A).

Figure 4:
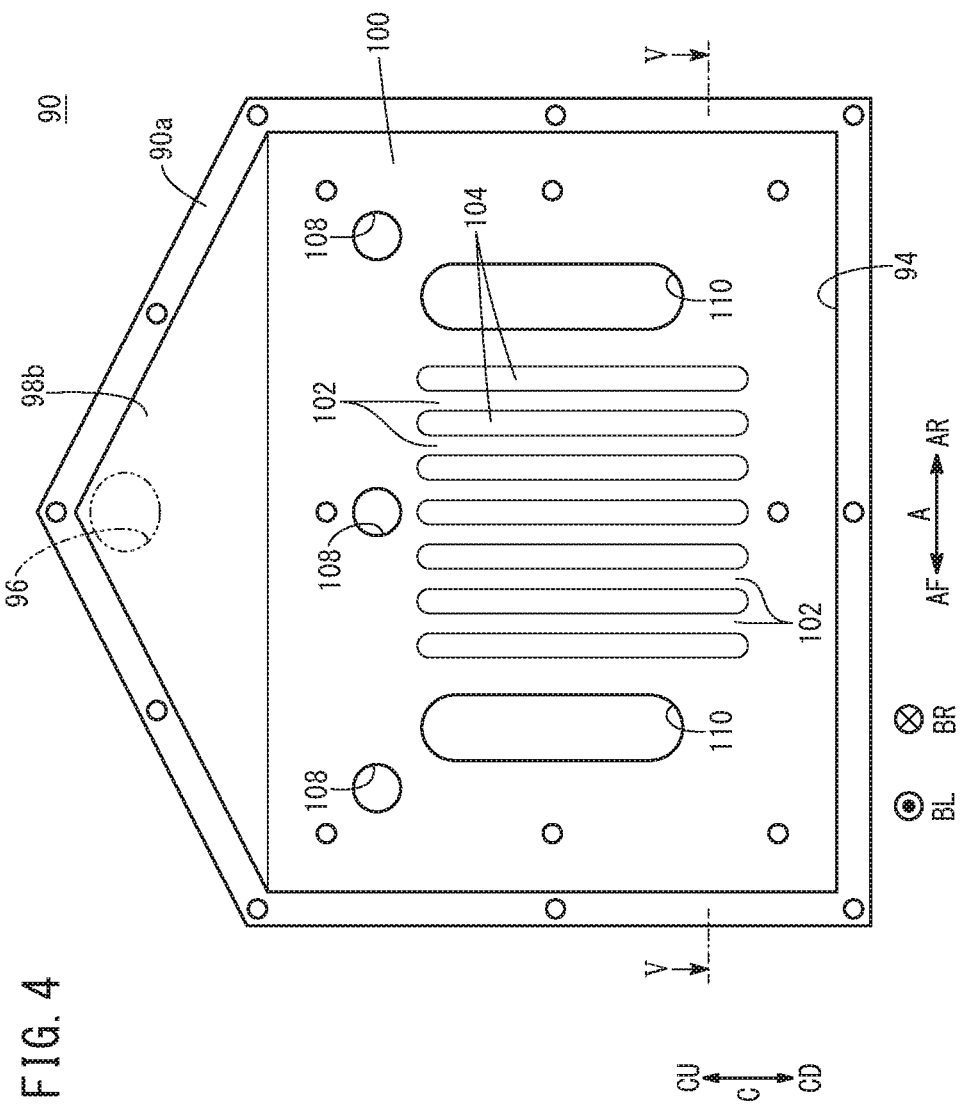
FIG. 4 is a front view showing a partition wall adjacent to the inside of an auxiliary device case.
Figure 5:
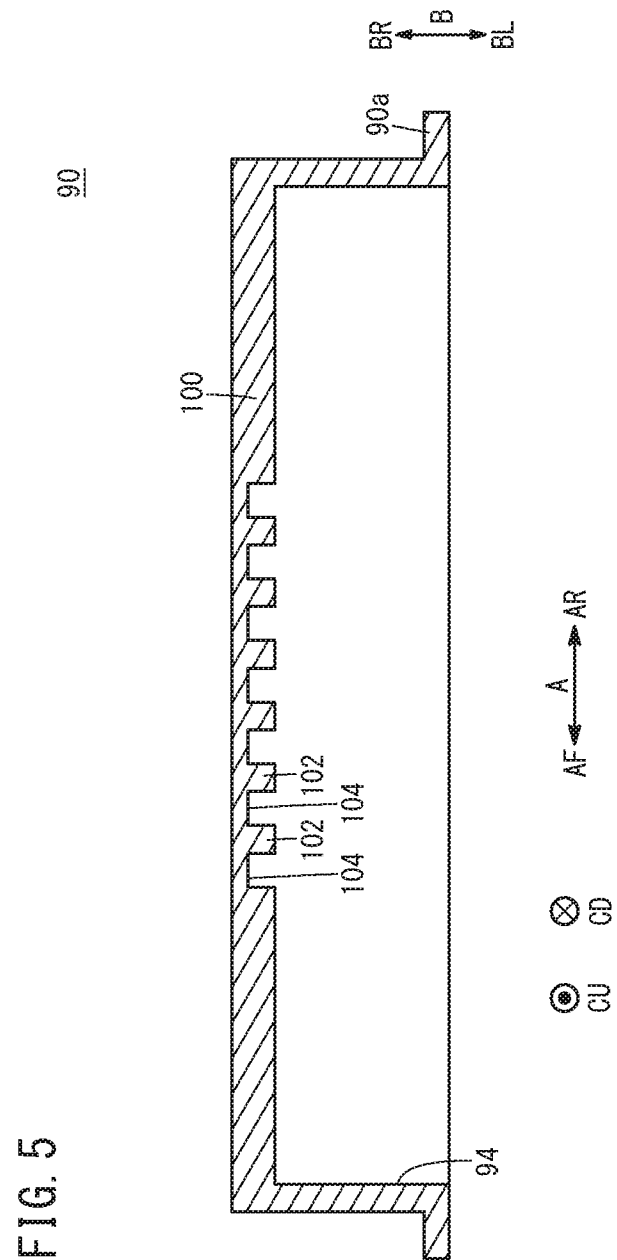
FIG. 5 is a cross sectional view taken along an arrow line V-V in FIG. 4.

A partition wall 100 is provided as a part of the auxiliary device case 26, at the right end of the first case member 90 (end in the direction indicated by the arrow BR). As shown in FIGS. 4 to 6, the left end side of the partition wall 100 (indicated by the arrow BL) is provided with a plurality of ribs 102. The ribs 102 protrude toward the inside of the auxiliary device case 26 (toward the auxiliary device storage space 94), and extend in the vertical direction (direction indicated by the arrow C). The plurality of ribs 102 are formed at intervals and reinforce the partition wall 100. In the embodiment of the present invention, as shown in FIG. 5, a plurality of grooves 104 are provided on a surface at the left end of the partition wall 100 (adjacent to the inside of the auxiliary device case 26). The grooves 104 extend in the vertical direction, and are provided at intervals in the horizontal direction. The ribs 102 are formed between the grooves 104 that are adjacent to each other. Stated otherwise, the grooves 104 are formed between the ribs 102 that are adjacent to each other. An upper end of each of the plurality of ribs 102 is provided at a position higher than the central position of the first case member 90 in the height direction (vertical direction). A lower end of each of the plurality of ribs 102 is provided at a position lower than the central position of the first case member 90 in the height direction (vertical direction).

As shown in FIGS. 3 and 6, the partition wall 100 and the case body 72 are joined tighter using bolts 84 in a manner that the right end side (indicated by the arrow BR) of the partition wall 100 closes the left opening 76 of the case body 72. Therefore, the right end side of the partition wall 100 contacts the left end of the stack 36 (FIGS. 1 and 3) provided inside the case body 72 (end in the direction indicated by the arrow BL), to have a function of the end plate on the left end side of the stack 36. That is, a tightening load in the stacking direction is applied to the stack 36 between the end plate 70 provided at the right end of the stack 36 and the partition wall 100 provided at the left end of the stack 36. It should be noted that, in FIG. 6, constituent elements such as the stack 36 and the fuel cell auxiliary device 24 provided in the case unit 66 are not shown.

Further, the partition wall 100 of the auxiliary device case 26 also serves as part of the stack case 22. The partition wall 100, the peripheral wall case 68, and the end plate 70 form an inner space of the stack case 22 storing the stack 36 (stack body 20) (hereinafter referred to as the "stack storage space 106").

As shown in FIGS. 1 and 6, the partition wall 100 is joined to the case body 72 as described above to form the case unit 66 where the stack case 22 is joined to the right side of the auxiliary device case 26 (indicated by the arrow BR). In this case unit 66, the stack storage space 106 is formed on the right side of the partition wall 100, and the auxiliary device storage space 94 is formed on the left side of the partition wall 100. That is, the inside of the stack case 22 and the inside of the auxiliary device case 26 that are adjacent to each other in the left/right direction (the stacking direction, the direction indicated by the arrow B, the horizontal direction) are partitioned by the partition wall 100.

As shown in FIGS. 3 and 4, a plurality of (three, in the embodiment of the present invention) ventilation connection ports 108 are provided at an upper part of the partition wall 100. The ventilation connection ports 108 connect the stack storage space 106 and the auxiliary device storage space 94. Further, for example, two longitudinally elongated piping openings 110 are formed in the partition wall 100. Connection pipes (not shown) connected to the oxygen-containing gas supply passage 52*a*, the oxygen-containing gas discharge passage 52*b*, the fuel gas supply passage 56*a*, the fuel gas discharge passage 56*b*, the coolant supply passage 54*a*, and the coolant discharge passage 54*b* (see FIG. 2), which are formed in the stack body 20, are inserted through the piping openings 110.

The seal member 86 is provided outside the ventilation connection ports 108 and the piping openings 110 between the partition wall 100 and the case body 72. It should be noted that, in FIG. 6, the seal member 86 provided between the partition wall 100 and the case body 72 is not shown.

As shown in FIG. 3, in the case unit 66, the air flows through ventilation holes 112 penetrating through a lower part of the end plate 70, a lower part of the rear panel 74, and a lower part of a side wall of the auxiliary device case 26, respectively, and can flows into the case unit 66 (the stack storage space 106 and the auxiliary device storage space 94). It should be noted that, in FIG. 1, the ventilation holes 112 are not shown.

As shown in FIG. 1, a stack side exhaust gas duct 114 is connected to each of the stack side passages 82 of the case unit 66. That is, the stack side passages 82 connect the inside of the stack case 22 (stack storage space 106) to the stack side exhaust gas duct 114. Further, an auxiliary device side exhaust gas duct 116 is connected to the auxiliary device side passage 96 of the case unit 66. That is, the auxiliary device side passage 96 connects the inside of the auxiliary device case 26 (auxiliary device storage space 94) to the auxiliary device side exhaust gas duct 116.

Each of the stack side exhaust gas duct 114 and the auxiliary device side exhaust gas duct 116 is connected to a coupling exhaust gas duct 118. The left end of the coupling exhaust gas duct 118 (end indicated by the arrow BL) is connected to a left exhaust gas port 122L provided at a left fender 120L of the fuel cell vehicle 12. Further, the right end of the coupling exhaust gas duct 118 (end in the direction indicated by the arrow BR) is connected to a right exhaust gas port 122R provided at a right fender 120R of the fuel cell vehicle 12. That is, the coupling exhaust gas duct 118 is connected to the outside of the fuel cell vehicle 12 through the left exhaust gas port 122L and the right exhaust gas port 122R.

In the structure, in the case where leakage from the stack body 20 and the fuel cell auxiliary device 24, etc. occurs, the leaked fuel gas is discharged to the outside of the fuel cell vehicle 12 through at least one of the stack storage space 106 and the auxiliary device storage space 94 and at least one of the stack side exhaust gas duct 114 and the auxiliary device side exhaust gas duct 116, and the coupling exhaust gas duct 118.

Operation of the fuel cell system 10 having the above structure will be described below. In the fuel cell vehicle 12, power generation by the fuel cell system 10 is performed during operation of the fuel cell vehicle 12. In this case, the fuel gas is supplied to the fuel gas supply passage 56a (FIG. 2) of the stack 36, the oxygen-containing gas is supplied to the oxygen-containing gas supply passage 52a (FIG. 2) of the stack 36, and the coolant is supplied to the coolant supply passage 54a (FIG. 2) of the stack 36, through the connection pipes.

As shown in FIG. 2, the fuel gas supplied to the fuel gas supply passage 56a flows into the fuel gas flow field 60 of the second separator 42, and flows along the anode 48. The oxygen-containing gas supplied to the oxygen-containing gas supply passage 52a flows into the oxygen-containing gas flow field 58 of the first separator 40, and flows along the cathode 46.

In the membrane electrode assembly 38, the fuel gas supplied to the anode 48 and the oxygen-containing gas supplied to the cathode 46 are partially consumed in electrochemical reactions in the electrode catalyst layers to generate electrical energy. This electrical energy is utilized for enabling traveling of the fuel cell vehicle 12 (FIG. 1). The remaining fuel gas which has not been consumed in electrochemical reactions is discharged from the fuel gas discharge passage 56b, and the remaining oxygen-containing gas is discharged from the oxygen-containing gas discharge passage 52b.

In the meanwhile, the coolant supplied to the coolant supply passage 54a flows through the coolant flow field 62. After the coolant cools the membrane electrode assembly 38, the coolant is discharged from the coolant discharge passage 54b.

As shown in FIG. 1, leakage of the fuel gas such as the hydrogen-containing gas from the stack body 20 (stack 36) and/or the fuel cell auxiliary device 24 may occur inside the case unit 66. The leaked fuel gas is lighter than the air, and tends to move to the upper position of the case unit 66.

Therefore, as shown in FIG. 6, the leaked fuel gas in the auxiliary device storage space 94 of the case unit 66 flows into the auxiliary device side exhaust gas duct 116 in FIG. 1 through the auxiliary device side passage 96 provided in the inclined portion 98a in the upper part of the second case member 92. In this regard, as shown in FIGS. 4 to 6, the plurality of ribs 102 extending in the vertical direction are provided in the partition wall 100 adjacent to the auxiliary device storage space 94. Therefore, the leaked fuel gas flows through the grooves 104 formed between the ribs 102 that are adjacent to each other. Thus, the leaked fuel gas is guided in the direction in which the ribs 102 extend, toward the auxiliary device side passage 96 (FIG. 4 and FIG. 6) in the upper part of the auxiliary device case 26.

Further, for example, when the fuel cell vehicle 12 (FIG. 1) is tilted, as shown in FIG. 6, the leaked fuel gas in the auxiliary device storage space 94 flows through the ventilation connection ports 108 provided in the upper part of the partition wall 100, and can flow into the stack storage space 106. As shown in FIG. 1, the leaked fuel gas which flowed into the stack storage space 106 flows through the stack side exhaust gas duct 114 through the stack side passages 82 provided in the upper wall 72a of the case body 72. Also in this case, as shown in FIGS. 4 and 6, the leaked fuel gas in the auxiliary device storage space 94 flows through the groove 104 formed between the ribs 102 that are adjacent to each other, and then, the leaked fuel gas flows along the direction in which the ribs 102 extend, and is guided toward the ventilation connection port 108 provided at the upper part of the partition wall 100.

As shown in FIG. 1, the leaked fuel gas in the stack storage space 106 of the case unit 66 flows through the stack side exhaust gas duct 114 through the stack side passages 82. Further, for example, when the fuel cell vehicle 12 is tilted, as shown in FIG. 6, the leaked fuel gas in the stack storage space 106 flows through the ventilation connection ports 108 provided in the upper part of the partition wall 100, and can flow into the auxiliary device storage space 94. As shown in FIG. 1, the leaked fuel gas which flowed into the auxiliary device storage space 94 then flows into the auxiliary device side exhaust gas duct 116 through the auxiliary device side passage 96.

The stack side exhaust gas duct 114 and the auxiliary device side exhaust gas duct 116 are connected to the coupling exhaust gas duct 118, respectively. Therefore, the leaked fuel gas inside of the stack case 22 and the auxiliary device case 26 (the stack storage space 106 and the auxiliary device storage space 94) is discharged to the outside of the fuel cell vehicle 12 through the coupling exhaust gas duct 118, and it becomes possible to ventilate the inside of the stack case 22 and the auxiliary device case 26.

As described above, in the fuel cell system 10 according to the embodiment of the present invention, even if the leaked fuel gas occurs in the auxiliary device case 26, the leaked fuel gas can be guided toward the auxiliary device side passage 96 in the upper part of the auxiliary device case 26 along the direction in which the ribs 102 extend (vertical direction). Accordingly, it is possible to effectively discharge the leaked fuel gas in the auxiliary device case 26 into the auxiliary device side exhaust gas duct 116, and suitably ventilate the inside of the auxiliary device case 26.

In the fuel cell system 10 according to the above embodiment, the stack side passage 82 configured to connect the inside of the stack case 22 to the stack side exhaust gas duct 114 is provided in the upper part of the stack case 22, and the ventilation connection port 108 configured to connect the inside of the auxiliary device case 26 and the inside of the stack case 22 together is provided in the upper part of the partition wall 100.

In this case, as shown in FIG. 1, the inside of the stack case 22 can be ventilated through the stack side passages 82 and the stack side exhaust gas duct 114. Further, as shown in FIG. 6, the leaked fuel gas in the auxiliary device case 26 is guided in the direction in which the ribs 102 extend toward the ventilation connection ports 108 for allowing the leaked fuel gas to flow into the stack storage space 106 inside the stack case 22. Thus, the leaked fuel gas is discharged into the stack side exhaust gas duct 114 in FIG. 1 through the stack storage space 106. Further, as shown in FIG. 6, the leaked fuel gas in the stack case 22 flows from the ventilation connection ports 108 into the auxiliary device case 26. In this manner, the leaked fuel gas can be discharged into the auxiliary side exhaust gas duct 116 in FIG. 1 through the auxiliary device storage space 94. Thus, both of the inside of the auxiliary device case 26 and the inside of the stack case 22 (the auxiliary device storage space 94 and the stack storage space 106) can be ventilated suitably.

In the fuel cell system 10 according to the embodiment of the present invention, the partition wall 100 is a part of the auxiliary device case 26, and a tightening load is applied to the stack body 20, between the end plate 70 provided at one end in the stacking direction and the partition wall 100 provided at the other end in the stacking direction. In this case, the partition wall 100 plays a role of the end plate, and the partition wall 100 is formed by the part of the auxiliary device case 26. Thus, it is possible to reduce the number of component parts of the fuel cell system 10, and reduce the weight of the fuel cell system 10.

In the fuel cell system 10 according to the above embodiment, the plurality of grooves 104 extending in the vertical direction are provided at intervals from each other on the surface of the partition wall 100 adjacent to the inside of the auxiliary device case 26, and the rib 102 is formed between the grooves 104 that are adjacent to each other. By providing the ribs 102 in this manner, it is possible to suitably guide the leaked fuel gas to the auxiliary device side passage 96 and the ventilation connection ports 108. Further, even if the grooves 104 are provided to achieve reduction of the weight of the partition wall 100, it is possible to maintain the strength of the partition wall 100 by the ribs 102.

It should be noted that the plurality of ribs 102 may protrude toward the inside of the auxiliary device case 26, and extend in the vertical direction as a whole. Therefore, the ribs 102 may be inclined from the vertical direction, and may have a curved shape. Further, it is not essential to adopt structure where the plurality of ribs 102 are formed between the grooves 104 that are adjacent to each other. For example, the ribs 102 may protrude from the partition wall 100 having the planar shape toward the inside of the auxiliary device case 26, and extends in the vertical direction. Further, the plurality of ribs 102 may be formed of the same material as the partition wall 100, and may be formed as a member separate from the partition wall 100, and thereafter, joined together with the partition wall 100.

The present invention is not limited to the above described embodiment. Various modifications may be made without departing from the gist of the present invention.

For example, in the embodiment of the present invention, the auxiliary device case 26 is provided at the left end of the stack case 22. Alternatively, the auxiliary device case 26 may be provided at the right end of the stack case 22.

What is claimed is:

1. A fuel cell system comprising:
a stack case configured to store a stack body including a plurality of power generation cells stacked together in a horizontal direction; and
an auxiliary device case configured to store a fuel cell auxiliary device,
wherein inside of the stack case and inside of the auxiliary device case that are adjacent to each other in the horizontal direction are partitioned by a partition wall;
an auxiliary device side passage configured to connect the inside of the auxiliary device case to an auxiliary device side exhaust gas duct is provided in an upper part of the auxiliary device case;
a plurality of ribs protruding toward the inside of the auxiliary device case and extending in a vertical direction are provided in the partition wall;
a stack side passage configured to connect the inside of the stack case to a stack side exhaust gas duct is provided in an upper part of the stack case; and
a ventilation connection port configured to connect the inside of the auxiliary device case and the inside of the stack case together is provided in an upper part of the partition wall.

2. The fuel cell system according to claim 1, wherein the partition wall is a part of the auxiliary device case; and
a tightening load is applied to the stack body, between the end plate provided at one end in the stacking direction and the partition wall provided at another end in the stacking direction.

3. The fuel cell system according to claim 1, wherein a plurality of grooves extending in a vertical direction are provided at intervals from each other on a surface of the partition wall adjacent to the inside of the auxiliary device case; and
the rib is formed between the grooves that are adjacent to each other.

* * * * *